Figure 1:
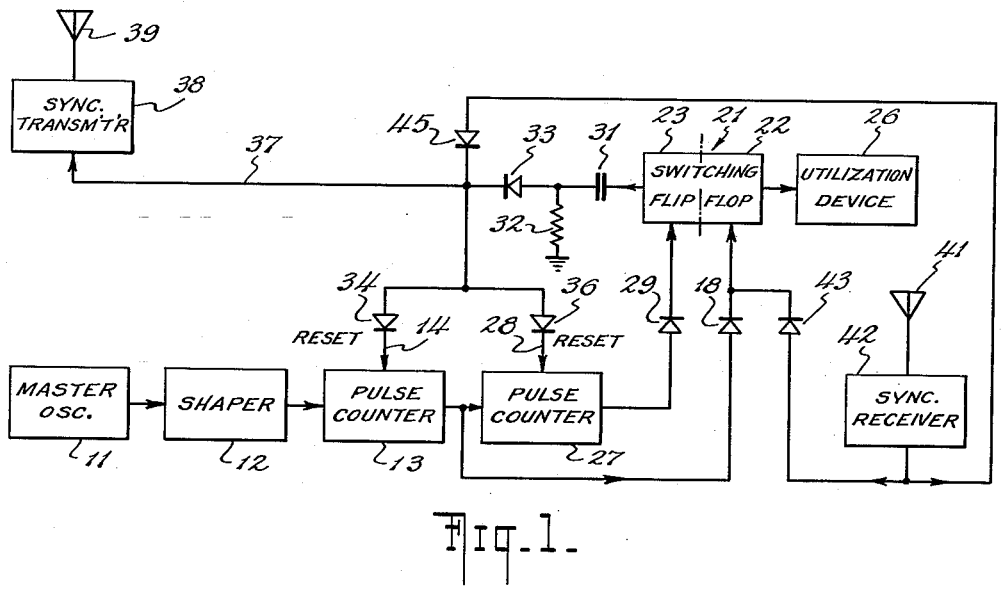

July 10, 1962

K. H. BARNEY ETAL 3,044,065

ELECTRONIC PROGRAMMING MEANS FOR SYNCHRONIZING
A PLURALITY OF REMOTELY LOCATED SIMILAR MEANS

Filed Aug. 5, 1957

2 Sheets-Sheet 1

INVENTORS
KAY H. BARNEY
LAWRENCE GREENSPAN
BY
ATTORNEY

United States Patent Office 3,044,065
Patented July 10, 1962

3,044,065
ELECTRONIC PROGRAMMING MEANS FOR SYNCHRONIZING A PLURALITY OF REMOTELY LOCATED SIMILAR MEANS
Kay H. Barney, Roslyn Heights, N.Y., and Lawrence Greenspan, San Diego, Calif., assignors to Sperry Rand Corporation, a corporation of Delaware
Filed Aug. 5, 1957, Ser. No. 677,180
5 Claims. (Cl. 343—227)

The present invention relates to electronic programming systems, and particularly a programming system which is capable of being automatically synchronized with one or more similar systems at different localities.

An arrangement for operating a utilization device so that it functions in one state for a certain length of time, after which the device functions in another state for a subsequent length of time, comprises one type of programming system. Such a system is useful, for example, for cyclically operating a transmit-receive control utilization device for turning on and off a radar jamming transmitter and receiver for detecting unfriendly radar signals. The operation of the control device is caused to follow a predetermined waveform output from the programming system so that the transmitter is turned on and receiver turned off during waveform excursions in one direction, while the transmitter is turned off and receiver turned on during intermediate waveform excursions in an opposite direction.

When a programming system on a type of aforedescribed, is located aboard each of a group of friendly aircraft carrying radar jamming equipment, for example, it is necessary to synchronize the programming systems and operation of the jamming equipment in all the aircraft. This is required so that the outputs from the jammer transmitters of the various aircraft are synchronized with each other and the operating times for the receivers of the aircraft are synchronized with each other.

Therefore, it is an object of the present invention to provide a novel electronic programming system.

It is a further object to provide a programming system which is readily synchronized in operation with other similar programming systems at different localities.

It is a further object of the invention to provide a highly accurate programming system responsive to a series of input pulses for providing an alternating output voltage waveform having positive and negative polarity excursions bearing a predetermined relationship to the recurrence of a first predetermined number followed by a second predetermined number, respectively, of input pulses.

The foregoing and other objects and advantages of this invention are attained by a programming system comprising a precision oscillator and shaper for providing a series of recurrent pulses at the oscillator frequency, a bistable switching circuit, and means including a plurality of counting circuits between the shaper and switching circuit. The counting circuits are arranged to cause the switching circuit to be alternately operated in one state for a certain number of cycles of the oscillator, and in another state for a further number of subsequent oscillator cycles. Reset input means are provided with each counting circuit for recycling the counters in response to any synchronizing pulse supplied thereto. The bistable switching circuit is also made responsive to such a synchronizing pulse for ensuring that it is operative in a predetermined one of its two stable operating states. Thus, initial operating conditions for starting or recycling the operating cycle of the system are established for any received synchronizing signal.

Figure 3:
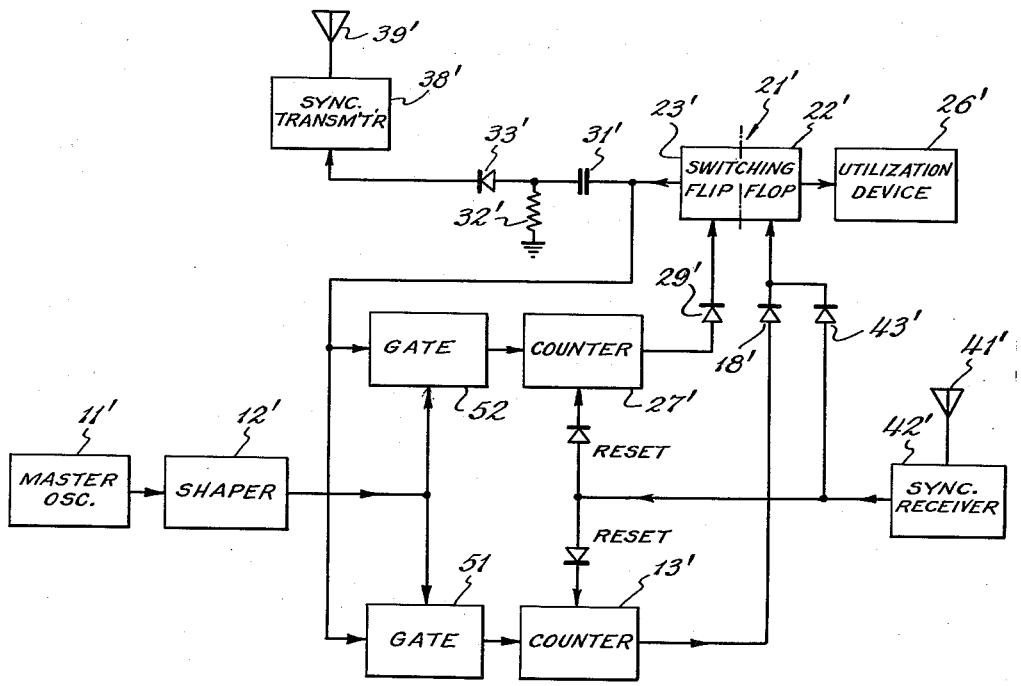
Figure 2:
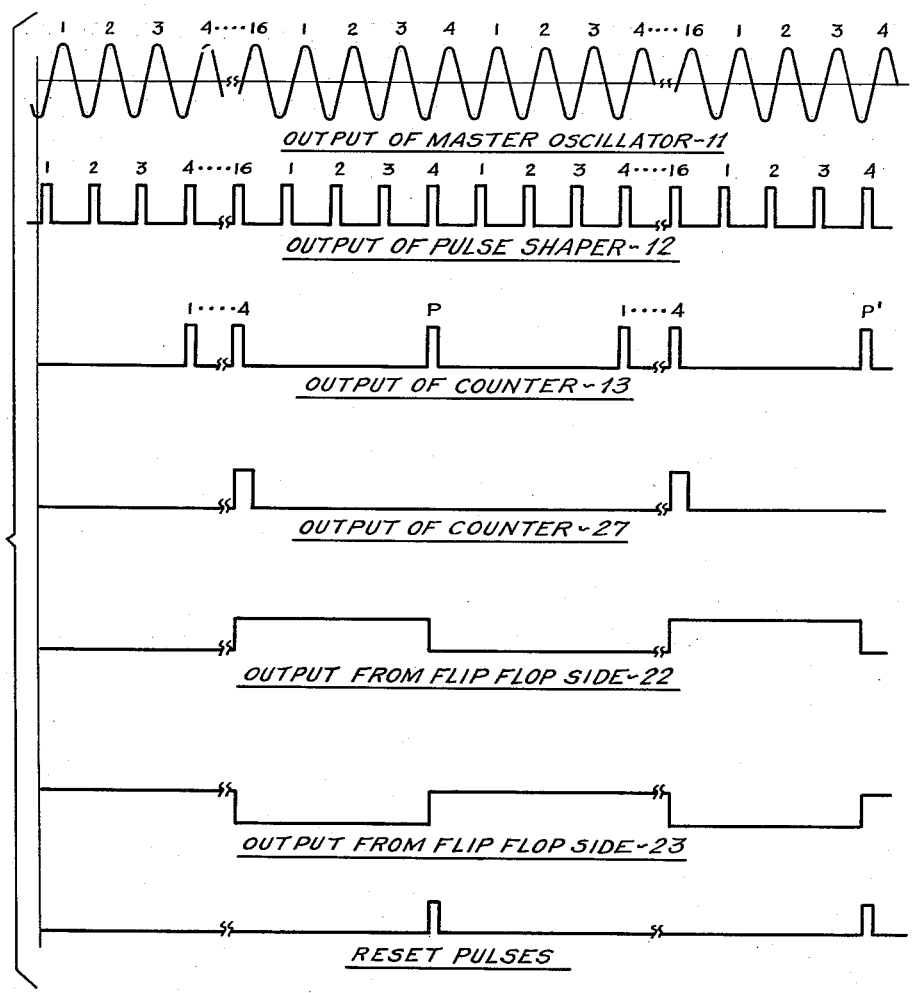

Referring now to the drawings,

FIG. 1 is a schematic diagram of a first embodiment of the present invention;
FIG. 2 is a waveform diagram of voltages occurring at various points in the system of FIG. 1, and;
FIG. 3 is a schematic diagram of a further embodiment of the present invention.

Referring now to FIG. 1, the numeral 11 designates a precision master oscillator for the system. Oscillator 11 is adapted to provide an accurate sine wave output voltage at a constant frequency. Such an oscillator might comprise, for example, a tuning fork or a crystal controlled oscillator of any suitable type known in the art.

The output voltage from the oscillator 11 is supplied to a wave shaping circuit 12. The circuit 12 is comprised of any suitable electronic means known in the art for producing a rectangular pulse output of predetermined duration and constant amplitude having a positive polarity, for example, for each cycle of the oscillations provided by the oscillator 11. Thus, a series of recurrent pulses of constant repetition rate corresponding to the frequency of oscillator 11 is provided at the output of shaper 12. The voltage waveform outputs provided by the circuits 11 and 12 are illustrated in FIG. 2.

A first pulse counting circuit 13 is coupled to the output of the shaper 12 for producing an output pulse waveform at a repetition rate which is a submultiple of the repetition rate of the pulses from wave shaper 12. The counting circuit 13 comprises any type of pulse counter known in the art such as a plurality of bistable multivibrator circuits, magnetic core devices or a diode step counter, for example. It should be arranged for providing a positive rectangular pulse output of predetermined duration and magnitude in response to a set number of input pulses, the counter 13 being of a type which recycles itself back to a zero or inactive state when an output is provided therefrom. Counter 13 also includes a reset input lead 14 for resetting it back to its zero state in response to any positive reset pulse appearing on lead 14. Such a counter is well known in the art so requires no detailed explanation.

The output from the counter 13 is supplied by way of an isolating rectifier 18 for passing positive pulses to the input of one side 22 of a switching flip-flop circuit 21. The circuit 21 comprises a bistable multivibrator, for example, whose other side is indicated by numeral 23. As is conventional in the art, flip-flop 21 has two stable states of operation, one with side 22 conducting and side 23 non-conducting, the other with side 23 conducting and side 22 non-conducting. The voltage waveforms at the output leads from the opposite sides 22 and 23 of flip-flop 21 are indicated in the waveform diagram of FIG. 2.

The voltage output from side 22 of flip-flop 21 is applied to a utilization device 26. If the system in FIG. 1 is utilized for programming radar jamming and receiving apparatus (not shown) of an aircraft, for example, the device 26 would comprise suitable transmit-receive control means for turning the jammer on and receiver off during a negative voltage excursion at the output from side 22 of flip-flop 21, while turning the jammer off and receiver on in response to a positive voltage excursion at the aforesaid output. Thus, the transmitter would generate a suitable output for jamming enemy radar signals during one time interval, the receiver being operable for a subsequent time interval for receiving enemy radar signals if present so that it can be told whether or not jamming is necessary. It should be understood, however, that the output from flip-flop 21 could be used for programming any of many different types of events, and is not restricted to programming of a jamming radar system as aforedescribed.

The output from counter 13 is also supplied to a further pulse counter 27 which is similar to counter 13, for example, except that counter 27 should be adapted to provide slightly wider output pulses than counter 13 for reasons which will become more clear below. Each output pulse from counter 27 comprises a positive pulse of predetermined magnitude and duration which is supplied through an isolating rectifier 29 to flip-flop side 23. Counter 27 has a reset input lead 28 connected to suitable means within the counter for resetting the counter to an initial or zero state in response to any positive pulse appearing on lead 28.

The counting properties of counters 13 and 27 could be the same or different, and are a function of the programming requirements for the system. In one example for which the waveform diagrams of FIG. 2 are applicable, the oscillator 11 had a frequency of 1000 cycles per second while shaper 12 produced a 10 microsecond output pulse for each cycle. The pulse counter 13 produced one output pulse of approximately 10 microseconds duration for every four pulses supplied thereto from shaper 12, while counter 27 produced one output pulse of a duration somewhat longer than 10 microseconds for every four pulses supplied thereto from counter 13. Thus, the counter 27, produced an output pulse for every 16 pulses supplied to the input of the counter 13 from shaper 12.

The flip-flop 21 is operated in a conventional manner so that it changes from one stable operating state to the other only when a positive pulse input from one or the other of counters 13 and 27 is received by a non-conducting side of flip-flop 21. If a positive pulse from one of counters 13 and 27 is supplied to a conducting side of flip-flop 21, the operation of flip-flop 21 is unaffected.

The output from side 23 of the switching flip-flop 21 is differentiated by a capacitor 31 and resistor 32 to produce a narrow rectangular pulse of approximately the same duration as the pulses from shaper 12 each time the flip-flop 21 changes from one stable operating state to the other. The rectifier 33 is provided for supplying only the positive pulses from differentiator 31—32 to further isolating rectifiers 34 and 36 in parallel with each other. The rectifiers 34 and 36 are in series with the reset input leads 14 and 28, respectively, for the counters 13 and 27, respectively.

Positive pulses at the output of differentiator 31—32 are also supplied via lead 37 to a synchronizing pulse signal transmitter 38. Transmitter 38 comprises any suitable means known in the art for generating a narrow pulse of energy having a predetermined carrier frequency, each output from transmitter 38 being generated in response to a positive pulse appearing on lead 37. A suitable antenna 39 is provided for broadcasting each synchronizing pulse signal in all directions from the locality of the disclosed system. It is intended that any synchronizing pulse radiated by antenna 39 be picked up by similar programming systems located aboard neighboring aircraft, for example, for synchronization of the systems.

A further antenna 41 is provided for receiving synchronizing pulse signals from antenna 39 and receiving synchronizing pulse signals transmitted by other similar programming systems at different localities. The pulses received by antenna 41 are supplied to a synchronizing pulse receiver 42 tuned to the carrier frequency of the pulses. Receiver 42 produces a positive rectangular output pulse for each synchronizing pulse signal received thereby, the positive pulses from receiver 42 being supplied via an isolating rectifier 43 to the input of the side 22 of flip-flop 21. Pulses from receiver 42 are also supplied by rectifier 45 to the reset input leads 14 and 28 of the counters 13 and 27, respectively. Each pulse provided by receiver 42 is preferably of constant amplitude and approximately the same duration as the pulses from shaper 12.

The operation of the system in FIG. 1 is best understood while referring to the waveform diagram in FIG. 2. Let it be assumed that the side 22 of the switching flip-flop 21 is conducting and that side 23 is non-conducting. Let it be further assumed that the counters 13 and 27 are in their inactive or zero states, i.e. have yet to be energized by pulses to be counted. Also, consider that each of counters 13 and 27 has a capacity of four, for example, for providing an output pulse for every fourth input pulse supplied thereto. When the master oscillator 11 is turned on, the pulse counter 13 starts counting the series of pulses supplied thereto from shaper 12. A positive pulse output is provided from counter 13 in synchronism with every fourth pulse of the aforementioned pulse series from shaper 12, as is indicated in FIG. 2.

Since the side 22 of flip-flop 21 is conducting, as was assumed above, the aforementioned pulses from counter 13 have no effect thereon. However, the pulses from counter 13 drive counter 27 into various stages of an active state. On the fourth pulse output provided by counter 13, the counter 27 reaches its capacity and emits a positive output pulse which is supplied to the input side 23 of flip-flop 21 for reversing the operation of the flip-flop 21.

Since the side 23 of flip-flop 21 was assumed non-conducting, the positive pulse output from counter 27 drives side 23 into a conducting state, side 22 becoming non-conductive in typical multivibrator fashion. The pulse output provided by counter 27 should be slightly wider than the pulse output provided by counter 13 for ensuring that the flip-flop 21 changes its operating state. If it were not wider, the pulse output from counter 13 in synchronism with the pulse output from counter 27 might inhibit the aforementioned change since the output from counter 13 is applied to the other side 22 of the flip-flop 21.

When the operation of flip-flop 21 changes as aforedescribed, the magnitude of the voltage at the output of side 22 rises to a maximum value and the voltage at the output of side 23 falls to a minimum value as indicated in FIG. 2. The negative pulse produced by differentiator 31—32 at this time is of the wrong polarity for passage through rectifier 33, so has no effect on the system.

The voltage waveform at the side 22 of the flip-flop 21, which side is now non-conducting, remains at a maximum value until the fourth of a subsequent group of pulses after the initial group of sixteen pulses is supplied to the counter 13. At this time, counter 13 again reaches its capacity and emits a positive pulse designated by P in the waveform diagram of FIG. 2. This positive pulse P from counter 13 drives the side 22 of flip-flop 21 back into a conducting state, flip-flop side 23 going back into a non-conducting state.

When the flip-flop side 23 changes from a conducting to a non-conducting state, a positive going reset pulse is provided at the output of differentiator 31, 32. This positive pulse is supplied by way of rectifier 33 and rectifiers 34 and 36 to the reset input leads 14 and 28 from the counters 13 and 27, respectively. The reset pulse erases the effect of the foregoing pulse P supplied to counter 27 from counter 13 by causing the counter to be reset back to its zero state. The foregoing reset pulse supplied to counter 13 is of no particular significance at this time since counter 13 would already be recycled itself when the output pulse therefrom is produced.

On the recurrence of the sixteenth pulse from shaper 12 following the time pulse P was generated, a pulse is produced at the output of the counter 27 which again reverses the operation of the switching flip-flop 21. Again, the switching flip-flop 21 is in a state whereby side 22 is non-conductive and side 23 is conductive. This condition remains until a second positive pulse P' is produced at the output of the counter 13 in response to a fourth pulse from shaper 12 following the time side 22 was rendered non-conductive. This pulse P' drives the flip-flop side 22 into a conducting state to complete another cycle, conditions in the system being established again for providing a further cycle of operation.

From the foregoing, it will be seen that the waveform output from the side 22 of flip-flop 21 will have a minimum value during the time interval required for sixteen pulses to recur at the output of the shaper 12. The aforementioned output will have a maximum value for a following time interval required for four pulses to recur at the output of the shaper 12.

Each time a positive going reset pulse is produced at the output of the differentiator 31, 32, it is also supplied to transmitter 38. Such a pulse triggers transmitter 38 for broadcasting a synchronizing pulse signal to other similar systems located at different localities. The signal broadcasted from antenna 39 is received by the receivers in such systems, for producing synchronizing pulses in the systems so that the programming thereof will be substantially in phase with each other.

Any broadcasted synchronizing signal, either from the present system or a similar system at a different locality, is detected by receiver 42. Suitable means are included in receiver 42 for generating a positive rectangular synchronizing pulse for each signal detected thereby. Such a pulse causes flip-flop side 22 to be driven into a conductive state if not already in such a state. Also, since a synchronizing pulse from receiver 42 is supplied to the reset inputs for the pulse counters 13 and 27, either or both counters are driven back to their zero or inactive states, if not already in such a state. Therefore, regardless of what portion of the operating cycle that the system may be in, any synchronizing pulse from the receiver 42 will cause the system to begin a new cycle. If many such systems are employed at different localities, it can be seen that all of the systems are synchronized to the first one which broadcasts a synchronizing signal.

A further embodiment of the present invention is illustrated in FIG. 3. Parts thereof which are similar in construction and in function to parts of the system in FIG. 1 are designated by primed reference numerals. The system shown in FIG. 3 differs from the system in FIG. 1 mainly in the fact that the counters 13' and 27' are in parallel paths rather than in series with each other.

The system in FIG. 3 also includes gate circuits 51 and 52 between counters 13' and 27', respectively, and the output of shaper 12'. Each of gate circuits 51 and 52 comprises suitable electronic means for passing or blocking the passage of pulses from shaper 12' to the counters 13' and 27' in accordance with whether the output voltage waveform from the side 23' of flip-flop 21' is at a maximum or minimum value. Gate circuit 51 is adapted to be closed and gate circuit 52 adapted to be open when flip-flop side 23' is non-conducting. Gate circuit 51 is adapted to be open and gate circuit 52 adapted to be closed when flip-flop side 23' becomes conductive.

In operation of the system shown in FIG. 3, let it be assumed that the counters 13' and 27' are in zero or inactive operating states and that the side 22' of flip-flop 21' is conductive while side 23' is non-conductive. Thus, gate 52 is open for allowing passage of pulses from shaper 12' therethrough and gate 51 is closed for blocking passage of pulses from shaper 12'. When the oscillator 11' is turned on, the pulses from shaper 12' are supplied through the gate circuit 52 to the counter 27', which starts to operate. Counter 27' might have a capacity of sixteen, for example, if it is required that flip-flop 21' provide an output as illustrated in FIG. 2. Thus, counter 27' emits a positive output pulse on the sixteenth pulse from shaper 12'. This pulse triggers side 23' into a conducting state, the side 22' becoming non-ductive.

On the foregoing reversal of operation of the flip-flop 21', the gate 51 is opened and the gate 52 is closed by the output from flip-flop side 23'. If counter 13' has a capacity of four, it responds to produce a positive output pulse on the fourth pulse from shaper 12' after opening of gate 51. This pulse drives flip-flop side 22' into a conducting state, whereby flip-flop side 23' becomes non-conducting. Thus, gate 52 is opened and gate 51 again becomes closed and one cycle of operation is completed. Since the counters reset themselves upon emitting a positive pulse, the system is in condition for repeating its operating cycle over again.

If a synchronizing pulse signal is received by the antenna 41', the positive synchronizing pulse output from the receiver 42' causes the counters 13' or 27' to be recycled back into their inactive or zero states since such a pulse is applied to their reset input leads as is illustrated in FIG. 3. Also this synchronizing pulse is supplied to the side 22' of the switching flip-flop 21' for insuring that it is in a conductive state, just as in the system of FIG. 1. Thus, it should be apparent that the system in FIG. 3 can be adapted to produce a waveform output from the switching flip-flop 21' which is identical with that shown in FIG. 2.

It should be apparent that in certain applications the synchronizing signals may be superimposed on the jamming signals and both transmitted from a common transmitter. In this case separate syncronizing pulse signal transmitting systems and pulse signal receiving systems would not be required.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An electronic programming system, comprising means for generating a series of timing pulses, first pulse counter means for response to a first number of said timing pulses for providing a first trigger pulse, second pulse counter means for response to a different number of said timing pulses for providing a second trigger pulse, bistable means for response to said first trigger pulse for operation in one of two stable operating states, said bistable means being further responsive to said second trigger pulse for operation in the other of said two stable operating states, transmitter means for response to a change in operation of said bistable means from said other to said one state for broadcasting a synchronizing pulse, means for response to the reception of a broadcast synchronizing pulse for recycling said counter means and for setting the bistable means in said one stable state if it is not already in that state.

2. An electronic programming system as set forth in claim 1, wherein said first and second pulse counter means are connected in tandem between said generating means and a first input of said bistable means, the output of said first pulse counter means being connected to a second input of said bistable means, said second pulse counter means being adapted to provide a trigger pulse of slightly wider duration than the trigger pulse provided by said first counter means.

3. An electronic programming system as set forth in claim 1, wherein said first and second counter means are in parallel paths for receiving said timing pulses, the outputs of said first and second counter means being connected to first and second inputs of said bistable means, respectively.

4. An electronic programming system comprising means for generating a series of timing pulses, first pulse counter means responsive to a first number of said timing pulses for providing a first trigger pulse, second pulse counter means responsive to a different number of said timing pulses for providing a second trigger pulse, bistable means responsive to said first trigger pulse for operation in one of two stable operating states, said bistable means being further responsive to said second trigger pulse for operation in the other of said two stable operating states, means connected to said bistable means for producing a control pulse upon a change in operation of said bistable means from said other to said one state, means for transmitting a synchronizing pulse in response to said control pulse, said control pulse being applied to said means for transmitting, means for applying said control pulse to said first and second pulse counter means for resetting said first and second pulse counter means, and means responsive to the reception of a transmitted synchronizing pulse for resetting said first and second pulse counter means and for setting said bistable means in said one stable state if it is not already in that state.

5. In combination, means for generating a series of timing pulses, first pulse counter means responsive to a first number of said timing pulses for providing a first trigger pulse, second pulse counter means responsive to a different number of said timing pulses for providing a second trigger pulse, bistable means responsive to said first trigger pulse for operation in one of two stable operating states, said bistable means being responsive to said second trigger pulse for operation in the other of said two stable operating states, means connected to said bistable means for producing a control pulse upon a change in operation of said bistable means from said other to said one state, means for applying said control pulse to said first and second pulse counter means for resetting said first and second pulse counter means, and means responsive to a synchronizing pulse for resetting said first and second pulse counter means and for setting said bistable means in said one stable state if it is not already in that state.

References Cited in the file of this patent

UNITED STATES PATENTS

| | | |
|---|---|---|
| 2,332,300 | Cook | Oct. 19, 1943 |
| 2,422,698 | Miller | June 24, 1947 |
| 2,489,303 | Lifschutz | Nov. 29, 1949 |
| 2,584,811 | Phelps | Feb. 5, 1952 |
| 2,817,759 | Thompson | Dec. 24, 1957 |
| 2,820,153 | Woll | Jan. 14, 1958 |
| 2,834,833 | Segerstrom | May 13, 1958 |